Patented Aug. 11, 1931

1,817,982

UNITED STATES PATENT OFFICE

WINFRID HENTRICH AND MAX HARDTMANN, OF WIESDORF-ON-THE-RHINE, AND RUDOLF KNOCHE, OF LEVERKUSEN-ON-THE-RHINE, GERMANY, ASSIGNORS TO GENERAL ANILINE WORKS, INC., OF NEW YORK, N. Y., A CORPORATION OF DELAWARE

NEW CONDENSATION PRODUCTS OF THE DIAZINE SERIES

No Drawing. Application filed March 21, 1928, Serial No. 263,585, and in Germany March 31, 1927.

The present invention relates to condensation products of the diazine series of the general formula:

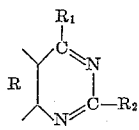

wherein R stands for a benzene or naphthalene nucleus which is substituted by any desired substituent, for example by halogen, an alkyl radicle, a nitro group or other substituents, and $R_1$ and $R_2$ represent substituents of the group consisting of $NH_2$, the substituted amino group, OH, O·aralkyl, O·aryl, SH, S·alkyl, S·aralkyl, S·aryl, $SO_2·OH$, $SO_2·$alkyl, $SO_2·$aralkyl and $SO_2·$aryl, $R_1$ and $R_2$ being either similar or dissimilar substituents.

Our new compounds can be prepared by causing appropriate quantities of dihalogenbenzodiazines, or dihalogen naphtho diazines which are substituted in the aromatic nucleus, in particular substituted 2.4-dihalogen-quinazolines, to react with two similar or dissimilar molecules of ammonia or a derivative thereof, caustic alkali, a sodium aralkyl-alcoholate, a sodium phenolate, a sodium bisulfide, a sodium alkyl-thio-alcoholate or a sodium aralkyl-thio-alcoholate or a sodium thiophenolate, a sodium bisulfite or a sodium salt of an alkyl-, aralkyl- or aryl-sulfinic acid.

The new condensation products thus obtainable are generally greyish to yellow brownish powders which if containing an acid group are soluble in water with a generally yellowish coloration. The products find the most varied application as such or after further decomposition for example, as intermediate products in the manufacture of dyestuffs.

The following examples will illustrate our invention without being limited thereto:

*Example 1.*—522 parts by weight of the sodium salt of 2-amino-5-hydroxynaphthalene-7-sulfonic acid are dissolved in 2000 parts of water, and 243 parts by weight of the most finely powdered 6-nitro-2.4-dichloroquinazoline are added at 33 C. while stirring well. After stirring for about an hour at 35° C., the temperature is slowly raised with constant stirring to 85° C. The nitro-dichloroquinazoline gradually disappears completely, a slimy, shiny golden mass being produced; the reaction of the mixture has become acid to Congo red. 345 parts by volume of a 10% solution of sodium carbonate are then slowly dropped in, and as soon as the 2-amino-5-hydroxynaphthalene-7-sulfonic acid can no longer be detected, sodium chloride and a little acetic acid are added to the still hot reaction mass with continued stirring. After filtration, pressing and drying the new condensation product, which in the form of the free acid has the following probable formula:

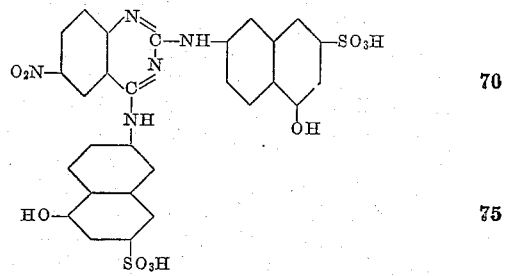

is obtained as a brownish yellow powder, moderately soluble in hot water. The compound dissolves readily in water with a yellow coloration on the addition of a little sodium carbonate; it does not react with nitrous acid, but couples with two molecules of diazo compounds. The nitro group can easily be reduced in the customary manner, for example with iron and acetic acid. The resulting amino compound is soluble in water with a faint yellow coloration; it can be diazotized and couples with two molecules of diazo compounds. Instead of the 6-nitro-2.4-dichloroquinazoline, homologues, analogues or substitution products of the 2.4-dihalogenquinazolines may also be used, for example the 6-methyl-2.4-dichloroquinazoline:

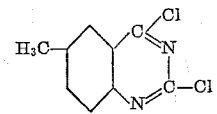

or the linear 2.4-dichloronaphthodiazine:

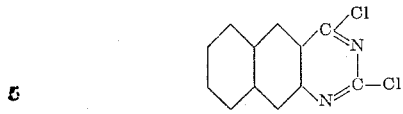

or the 6.8-dinitro-2.4-dichloroquinazoline (melting at 175° C. uncorrected):

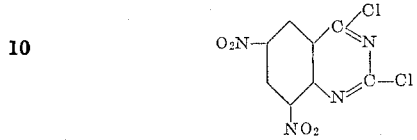

or the 7-2.4-trichloroquinazoline:

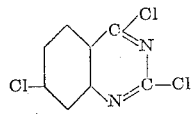

and many others.

The 2-amino-5-hydroxynaphthalene-7-sulfonic acid in the above example can be replaced by two similar molecules of other desired compounds, containing reactive hydrogen atoms attached to a nitrogen, oxygen or sulfur atom.

Compounds of more complex constitution can likewise be easily built up, say for example, by means of the 6-nitro-2.4-dichloroquinazoline. By further condensing, for example, one molecule of the reduced condensation product, obtained according to the above example, from one molecule of 6-nitro-2.4-dichloroquinazoline and two molecules of 2-amino-5-hydroxynaphthalene-7-sulfonic acid with one molecule of 2.4-dichloroquinazoline at 40° C. in dilute aqueous solution in the presence of sodium acetate until the starting materials have disappeared, then adding to the resulting intermediate product, which is precipitated as a yellowish slime and still contains one reactive halogen atom, the neutral aqueous solution of one molecule of the sodium salt of 2-amino-5-hydroxynaphthalene-7-sulfonic acid and slowly heating with thorough stirring to 80 to 85° C. until the 2-amino-5-hydroxynaphthalene-7-sulfonic acid can no longer be detected, the sodium salt of the compound of the probable formula is obtained:

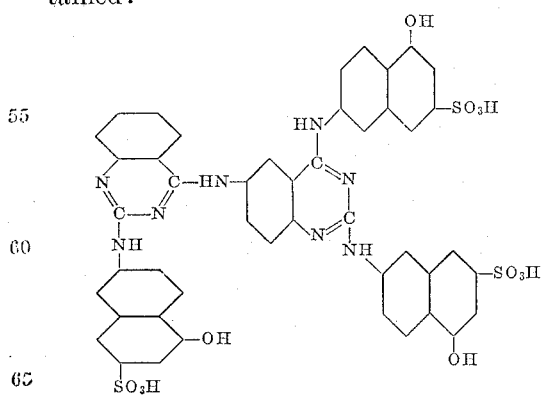

This first appears as a yellowish slime, which can be salted out and dissolves readily in hot water. The new compound can best be purified by dialysis. After drying it forms a yellowish grey powder; one molecule of the compound reacts with three molecules of diazo compounds.

*Example 2.*—341 parts by weight of the acid sodium salt of 1-amino-8-hydroxynaphthalene-3.6-disulfonic acid are dissolved in 5600 parts of hot water with the addition of caustic soda solution of 40° Bé., but maintaining the resulting solution acid to litmus. 243 parts by weight of finely powdered 6-nitro-2.4-dichloroquinazoline are added with thorough stirring at 20° C.; the mixture is heated slowly to 42° C. and kept at this temperature for about an hour. When the aminonaphthol sulfonic acid and the nitro-dichloroquinazoline can no longer be detected, the mixture is neutralized carefully at 30° C. with 700 parts by volume of 10% sodium carbonate solution. 196 parts by weight of aniline are added to the weakly acid (litmus) solution and heating is effected with thorough stirring to 80–85° C. This temperature is maintained for about three hours, when a solution of 70 parts by weight of calcined sodium carbonate is added to the reaction mixture and the excess of aniline is distilled off by means of steam. On salting out, the new condensation product is obtained in orange brown leaflets; in the state of the free acid it has the following probable formula:

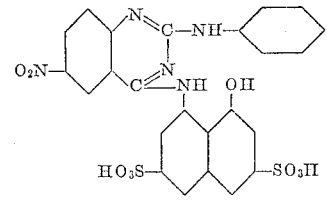

The condensation product dissolves readily in water with a yellow coloration; on the addition of acid, the solution becomes brighter. The compound does not react with nitrous acid. By reduction, for example, with iron and acetic acid, the corresponding amino compound is obtained, which is a yellow powder, dissolving in water with a reddish yellow coloration; the solution becomes more greenish on the addition of sodium carbonate. The new substance can be diazotized; the diazo compound is brownish yellow in color and couples slowly with 2-naphthol-3.6-disodiumsulfonate in alkaline sodium carbonate solution, giving a violet dyestuff. Diazotized sulfanilic acid couples with the above amino compound giving a clear bluish red.

Obviously the 1-amino-8-hydroxynaphthalene-3.6-disulfonic acid and the aniline in the above example can be replaced by other desired compounds, containing reactive hydrogen atoms attached to sulfur, oxygen or nitrogen atoms, for example by aminoanthraquinones.

*Example 3.*—24.6 parts by weight of 6-nitro-2.4-dichloro-quinazoline are finely powdered and dissolved in a little benzene by gently heating. This solution is run into a stirred solution of 34.1 parts by weight of the acid sodium salt of 1-amino-8-hydroxynaphthalene-3.6-disulfonic acid in 300 volumes of hot water, to which have been added 16.5 parts by weight of crystallized sodium acetate. The benzene-water suspension is well stirred at about 35° C. until aminonaphthol sulfonic acid can no longer be detected. The condensation product from one molecule of dichloro-quinazoline and one molecule of 1-amino-8-hydroxynaphthalene-3.6-disulfonic acid partly separates on cooling as a greenish grey, slimy precipitate.

The intermediate product which contains one reactive chloroatom is salted out, filtered off, and then the paste, thus obtained, is added in small portions to a melt of 20 parts by weight of phenol and 7.0 parts by weight of crystallized sodium acetate at a temperature of about 50° C. whilst stirring. When all the paste has been introduced, the melt is heated to 100° C. for some time. The condensation product thus obtained from one molecule of 6-nitro-2.-4-dichloro-quinazoline, 1 molecule of 1-amino-8-hydroxynaphthalene-3.6-disulfonic acid and one molecule of phenol after working up in the customary manner, having in its free state most probably the formula:

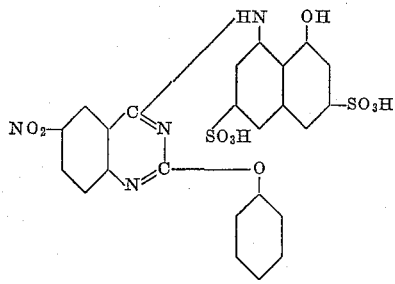

is a yellowish colored powder, which is moderately soluble in cold water. The new compound couples with diazo-bodies, and its alkaline solutions do not fluoroesce.

*Example 4.*—An aqueous solution of the condensation product from one molecule of 6-nitro-2.4-dichloro-quinazoline and one molecule of sulfino salicylic acid is prepared at 45° C. by the employment of 19.9 parts by weight of 2.4-dichloro-quinazoline and 22.4 parts by weight of the acid sodium salt of the sulfino-salicylic acid:

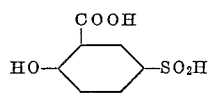

After the addition of a hot concentrated aqueous solution of 34 parts by weight of the acid sodium salt of pure 1-amino-8-hydroxynaphthalene-4.6-disulfonic acid and 14 parts by weight of crystallized sodium acetate, heating is effected for a prolonged time to 95° C. whilst stirring. When all the aminonaphthol sulfonic acid has disappeared, the further working up proceeds in the customary manner. The product thus obtained from one molecule of 6-nitro-2.4-dichloro-quinazoline, one molecule of sulfino-salicylic acid and one molecule of 1-amino-8-hydroxynaphthalene-4.6-disulfonic acid having in its free state the probable formula:

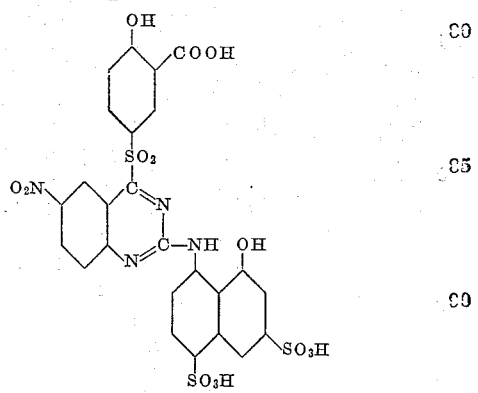

is a yellowish powder, which is readily soluble in caustic alkali. Its alkaline solution does not fluoresce.

We claim:

1. As new products, the compounds of the probable general formula:

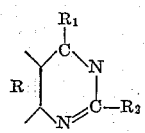

wherein R stands for a substituted benzene or naphthalene nucleus and $R_1$ and $R_2$ represent substituents of the group consisting of $NH_2$, the substituted amino group, OH, O-aralkyl, O-aryl, SH, S-alkyl, S-aralkyl, S-aryl, $SO_2$-HO, $SO_2$-alkyl, $SO_2$-aralkyl and $SO_2$-aryl, said compounds being generally greyish to yellow-brownish powders and, when containing an acid group, being soluble in water with a generally yellowish coloration.

2. As new products, the compounds of the probable general formula:

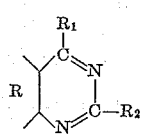

wherein R stands for a benzene nucleus substituted by a substituent of the group consisting of $NO_2$, $CH_3$ and Cl and $R_1$ and $R_2$ represent substituents of the group consisting of $NH_2$, the substituted amino group, OH, O-aralkyl, O-aryl, SH, S-alkyl, S-aralkyl, S·aryl, $SO_2$·OH, $SO_2$·alkyl, $SO_2$·aralkyl, and $SO_2$·aryl, said compounds being generally greyish to yellow-brownish powders and, when containing an acid group, being soluble in water with a generally yellowish coloration.

3. As new products, the compounds of the probable general formula:

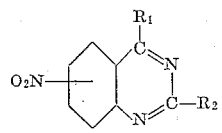

wherein $R_1$ and $R_2$ represent substituents of the group consisting of $NH_2$, the substituted amino group, OH, O·aralkyl, O·aryl, SH, S·alkyl, S·aralkyl, S·aryl, $SO_2$·OH, $SO_2$·alkyl, $SO_2$·aralkyl, and $SO_2$·aryl, said compounds being generally greyish to yellow-brownish powders and, when containing an acid group, being soluble in water with a generally yellowish coloration.

4. As new products, the compounds of the probable general formula:

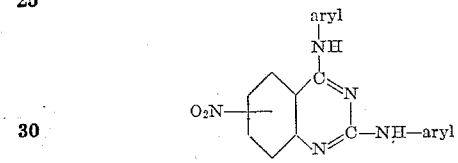

wherein the aryl radicles are similar or dissimilar, said compounds being generally greyish to yellow-brownish powders and, when containing an acid group, being soluble in water with a generally yellowish coloration.

5. As a new product the compound of the probable formula:

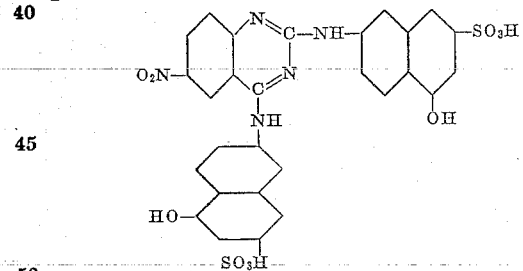

being a brownish yellow powder, moderately soluble in hot water, the compound dissolving readily in water with a yellow coloration on the addition of a little sodium carbonate, not reacting with nitrous acid, but coupling with two molecules of diazo compounds.

In testimony whereof we have hereunto set our hands.

WINFRID HENTRICH.
MAX HARDTMANN.
RUDOLF KNOCHE.